(12) United States Patent
Takahashi et al.

(10) Patent No.: US 11,703,868 B2
(45) Date of Patent: Jul. 18, 2023

(54) CONTROL DEVICE AND WORK MACHINE

(71) Applicant: HONDA MOTOR CO., LTD., Tokyo (JP)

(72) Inventors: Hiroto Takahashi, Wako (JP); Toshiaki Kawakami, Wako (JP); Taro Yokoyama, Wako (JP); Wei Song, Wako (JP); Takuya Kanisawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 17/211,899

(22) Filed: Mar. 25, 2021

(65) Prior Publication Data

US 2021/0302970 A1    Sep. 30, 2021

(30) Foreign Application Priority Data

Mar. 27, 2020    (JP) ................................. 2020-057882

(51) Int. Cl.
*A01D 34/84* (2006.01)
*G05D 1/02* (2020.01)
(Continued)

(52) U.S. Cl.
CPC ......... *G05D 1/0212* (2013.01); *A01D 34/008* (2013.01); *A01D 34/84* (2013.01);
(Continued)

(58) Field of Classification Search
CPC .. G05D 1/0212; G05D 1/0268; G05D 1/0276; G05D 1/0088; G05D 2201/0208;
(Continued)

(56) References Cited

U.S. PATENT DOCUMENTS 6,263,975 B1    7/2001  Rosa et al.
8,186,135 B2 *  5/2012  Leonardi ................ A01D 42/00
                                                      56/12.7
(Continued)

FOREIGN PATENT DOCUMENTS

WO    WO-2007109627 A2 *  9/2007  ........... A01D 34/008

*Primary Examiner* — Rachid Bendidi
*Assistant Examiner* — Dana F Artimez
(74) *Attorney, Agent, or Firm* — Amin, Turocy & Watson, LLP

(57) ABSTRACT

A control device capable of improving the position accuracy of map data is disclosed. The control device is configured to acquire information which is output from a working machine which includes a working part and works along a boundary between a working area and a non-working area. The control device includes an operating state acquisition part configured to acquire information indicating an operating state of a machine body of the working machine; a judgment part configured to determine the operating state of the machine body, based on information acquired by the operating state acquisition part; a position information acquisition part configured to acquire position information indicating a position of the machine body; and a storage control part configured to store the position information acquired by the position information acquisition part in the storage, based on a determination result of the judgment part.

12 Claims, 4 Drawing Sheets

(51) Int. Cl.
  *G05D 1/00* (2006.01)
  *A01D 34/00* (2006.01)
  A01D 101/00 (2006.01)
(52) U.S. Cl.
  CPC ......... *G05D 1/0268* (2013.01); *G05D 1/0276* (2013.01); *A01D 2101/00* (2013.01); *G05D 1/0088* (2013.01); *G05D 2201/0208* (2013.01)
(58) Field of Classification Search
  CPC ...... G05D 1/0227; G05D 1/0274; G05D 1/00; A01D 34/008; A01D 34/84; A01D 2101/00; A01D 34/043; A01D 34/06; A01D 34/42; A01D 34/86; A01G 3/00
  See application file for complete search history.

(56) References Cited

U.S. PATENT DOCUMENTS

| | | | |
|---|---|---|---|
| 8,983,738 B2 * | 3/2015 | Avitzur | E02F 9/205 |
| | | | 701/50 |
| 2017/0322559 A1 * | 11/2017 | Fukuda | G05D 1/0278 |
| 2019/0003137 A1 * | 1/2019 | Gao | G01S 15/93 |
| 2021/0200228 A1 * | 7/2021 | Grufman | G05D 1/0227 |

\* cited by examiner

CONTROL DEVICE AND WORK MACHINE

CROSS-REFERENCE TO RELATED APPLICATION

Priority is claimed on Japanese Patent Application No. 2020-057882, filed Mar. 27, 2020, the content of which is incorporated herein by reference.

BACKGROUND OF THE INVENTION

Field of the Invention

The present invention relates to a control device and a work machine.

Description of Related Art

In the related art, a lawn mower performs cutting of a lawn which is a working area along a boundary between a structure, concrete, tiles, a fence, or the like which are non-working areas, and an edge of the lawn which is a working area (hereinafter referred to as "edge mowing") is known (see, for example, Patent Document 1 (U.S. Pat. No. 6,263,975)).

In addition, as a lawn mower, there is a work machine that can automatically travel without being operated by an operator (hereinafter referred to as "autonomous traveling work machine"). The autonomous traveling work machine performs work, while automatically traveling on the ground, based on map data indicating a boundary between non-working areas and working areas, while identifying a position of the host machine from positioning signals received from, for example, GNSS satellites (satellites constituting a system such as a GPS, GLONASS, Galileo, BeiDou, QZSS, and Gagan). However, high costs are incurred in creating map data indicating the boundary between non-working areas and working areas.

A lawn mower that mows edges as described above is used at the boundary between non-working areas and working areas. Therefore, it is conceivable to use the position information of the lawn mower that mows an edge to generate map data indicating the boundaries between non-working areas and the working areas.

However, a lawn mower that mows an edge is not always at a boundary between a non-working area and a working area. Therefore, there is room for improvement when the position information of a lawn mower that mows an edge is used as it is for generating map data, since in this case the position accuracy of the map data cannot be improved.

Therefore, the present invention has been made in view of the aforementioned circumstances, and an object of the present invention is to provide a working machine capable of improving the position accuracy of map data as over that in the related art.

SUMMARY OF THE INVENTION

The control device and the working machine of the present invention have the following configurations.

(1) A control device (for example, a controller 50 of the embodiment to be described below) according to an aspect of the present invention, there is provided a control device which is configured to acquire information which is output from a working machine which includes a working part and works along a boundary between a working area and a non-working area. The control device includes an operating state acquisition part configured to acquire information indicating an operating state of a machine body of the working machine; a judgment part configured to determine the operating state of the machine body, based on information acquired by the operating state acquisition part; a position information acquisition part configured to acquire position information indicating a position of the machine body; and a storage control part configured to store the position information acquired by the position information acquisition part in the storage, based on a determination result of the judgment part.

Here, the working part (for example, a cutting part 30 to be described below) performs edge mowing (that is, cutting operation) of the lawn at a boundary Q as an example. In this case, the fact that the working part performs the cutting operation indicates that an autonomous traveling lawn mower 1 is located at the boundary Q. According to the controller 50 of the aspect (1), it is possible to generate map data that accurately indicates the position of the boundary Q.

(2) The control device according to the aspect (1) may further include a load detection part configured to detect a load generated in the working part, and the judgment part may determine the operating state, based on the load of the working part detected by the load detection part.

Here, in the autonomous traveling lawn mower 1, the working part (for example, the cutting part 30 to be described below) may be put into a non-operating state away from the ground G at a place other than the boundary Q, and the working part may be made to idle. According to the aspect of (2), as described above, the storage control part 57 does not store the own machine position information in the storage 53 when the cutting part 30 is idling. According to the controller 50 configured in this way, it is possible to generate map data that accurately indicates the position of the boundary Q.

(3) In the control device according to the aspect (1) or (2), the judgment part may determine the operating state, based on a movement direction of the machine body based on the operation of a traveling part, and a movement direction of the machine body indicated by the position information acquired by the position information acquisition part.

Here, when the movement direction of the machine body 10 based on the operation of the traveling part (for example, traveling wheels 20 to be described below) substantially matches the movement direction of the machine body 10 indicated by the position information acquired by the position information acquisition part (for example, a receiver 51 to be described below), it can be said that the own machine position information with high reliability can be acquired. According to the controller 50 of the aspect (3), it is possible to generate map data that accurately indicates the position of the boundary Q.

(4) The control device according to any one of aspects (1) to (3) may further include a correction part configured to correct the position information acquired by the position information acquisition part.

According to the controller 50 of the aspect (4), it is possible to reduce deterioration in accuracy of the map data due to deterioration in the position accuracy of the host machine position information.

(5) In the control device according to the aspect (4), the working part may operate in a predetermined direction, and the correction part may correct the position information based on an operation direction of the working part.

According to the controller 50 of the aspect (5), it is possible to suppress an accuracy degradation of the map data due to a degradation of the position accuracy of the own machine position information.

(6) In the control device according to the aspect (4) or (5), the working part may operate in a direction corresponding to the movement direction of the machine body, and the correction part may correct the position information based on the movement direction of the machine body indicated by the position information and the operation direction of the working part.

According to the controller 50 of the aspect (6), it is possible to suppress an accuracy degradation of the map data due to a degradation of the position accuracy of the own machine position information.

(7) In the control device according to any one of the aspects (4) to (6), the storage control part may store correction position information indicating a position at which the correction part is configured to correct the position information in the storage.

According to the controller 50 of the aspect (7), the correction position information can be used as information indicating a place in which the position accuracy of the own machine position information is degraded.

(8) The control device according to any one of aspects (4) to (7) may further include a direction detection part configured to detect the direction of the machine body, and the correction part may correct the position information based on the direction of the machine body detected by the direction detection part.

According to the controller 50 of the aspect (8), it is possible to suppress an accuracy degradation of the map data due to a degradation of the position accuracy of the own machine position information.

(9) According to an aspect of the present invention, there is provided a working machine (for example, an autonomous traveling lawn mower 1 of an embodiment to be described below) which works along a boundary between a working area and a non-working area. The working machine includes the control device according to any one of aspects (1) to (8), and the working machine.

According to the aspect (9), according to the controller 50 configured in this way, it is possible to generate map data that accurately indicates the position of the boundary Q.

(10) In the working machine according to the aspect (9), the working part may include a cutter which is rotatable on a rotating surface along a vertical direction of the machine body.

According to the autonomous traveling lawn mower 1 of the aspect (10), it is possible to cut the lawn at the edge portion of the working area vertically and with good appearance, while preventing the machine body (particularly the cutter) from coming into contact with the non-working area.

(11) The working machine according to the aspect (9) or (10) may further include a transmitter configured to transmit the position information stored in the storage to outside.

According to the autonomous traveling lawn mower 1 according to the aspect (11), the created map data can be transmitted to another autonomous traveling lawn mower via a server or the like. As a result, for example, when a plurality of autonomous traveling lawn mowers collaborate, since information on the boundary Q can be transmitted therebetween, the plurality of autonomous traveling lawn mowers can share a more accurate position of the boundary Q.

(12) The working machine according to any one of aspects (9) to (11) may further include a traveling part configured to move the machine body along the boundary between a working area and a non-working area.

According to the autonomous traveling lawn mower 1 according to the aspect (12), it is possible to autonomously move along the boundary between the working area and the non-working area and cut the lawn at the edge portion of the working area.

According to the present invention, it is possible to provide a control device and a working machine capable of improving the position accuracy of map data over that in the related art.

DETAILED DESCRIPTION OF THE INVENTION

Figure 1:
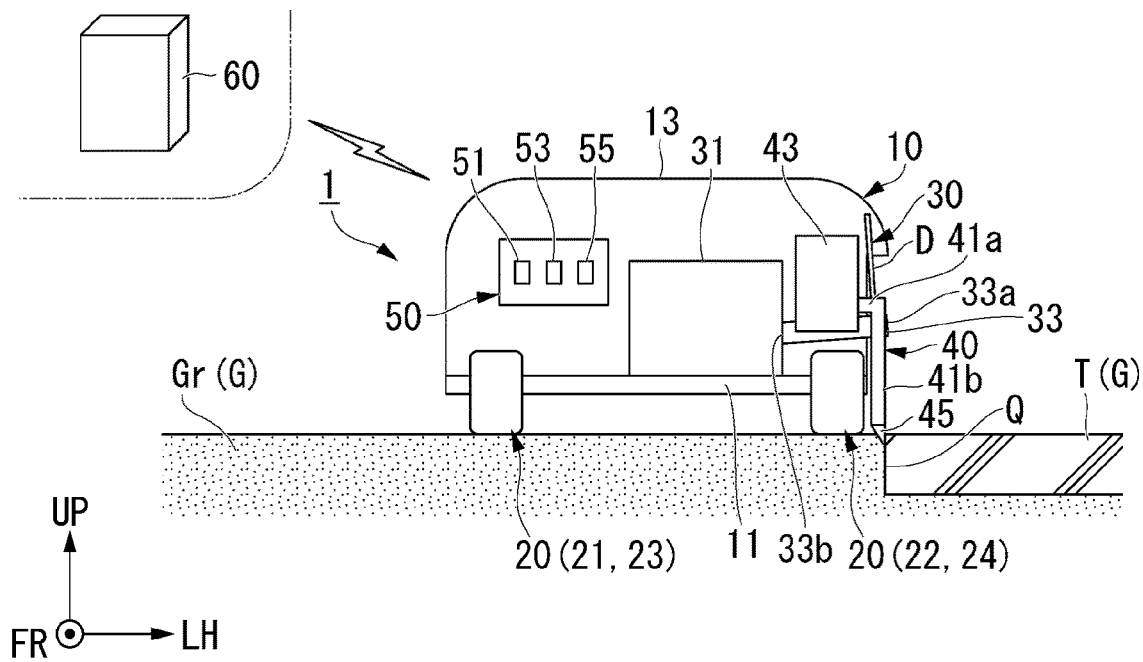
FIG. 1 is a diagram of front view of an autonomous traveling lawn mower of an embodiment as viewed from in front.

Hereinafter, an autonomous traveling lawn mower (corresponding to a "working machine" of the claims) according to the embodiment of the present invention will be described. In the following description, a vertical direction, a left-right direction, and a front-rear direction coincide with a vertical direction, a left-right direction, and a front-rear direction in the autonomous traveling lawn mower. In the drawings, FR indicates a front, LH indicates a left side, and UP indicates an upper side.

In the following explanation, the lawn means lawn grass. Lawn grass is an example of grass, and weeds are another example of grass.

FIG. 1 is a front view of the autonomous traveling lawn mower of the embodiment.

As shown in FIG. 1, the autonomous traveling lawn mower 1 is a working machine capable of independently traveling on the ground G without being operated by an operator. In particular, the autonomous traveling lawn mower 1 of the present invention is a so-called edge mowing working machine that cuts the grass at an edge portion of a lawn surface Gr, at a boundary between the lawn surface Gr (corresponding to the "working area" of the claims) on the ground G and a concrete surface T (corresponding to a "non-working area" of the claims).

The autonomous traveling lawn mower 1 includes a machine body 10, traveling wheels 20 (corresponding to a "traveling part" of the claim), a cutting part 30 (corresponding to the "working part" of the claim), a detection part 40, and a controller 50.

The machine body 10 includes a frame 11 and a cover 13.

The frame 11 is formed by, for example, a metal member with a rectangular plate shape in a plan view. The frame 11 is provided with traveling wheels 20, a cutting part 30, a detection part 40, a controller 50, and the like, which will be described later. The cover 13 is formed by, for example, a resin material in a box shape. The cover 13 covers the frame 11, the traveling wheels 20, the cutting part 30, the detection part 40, and the controller 50 provided on the frame 11 from above.

Figure 2:
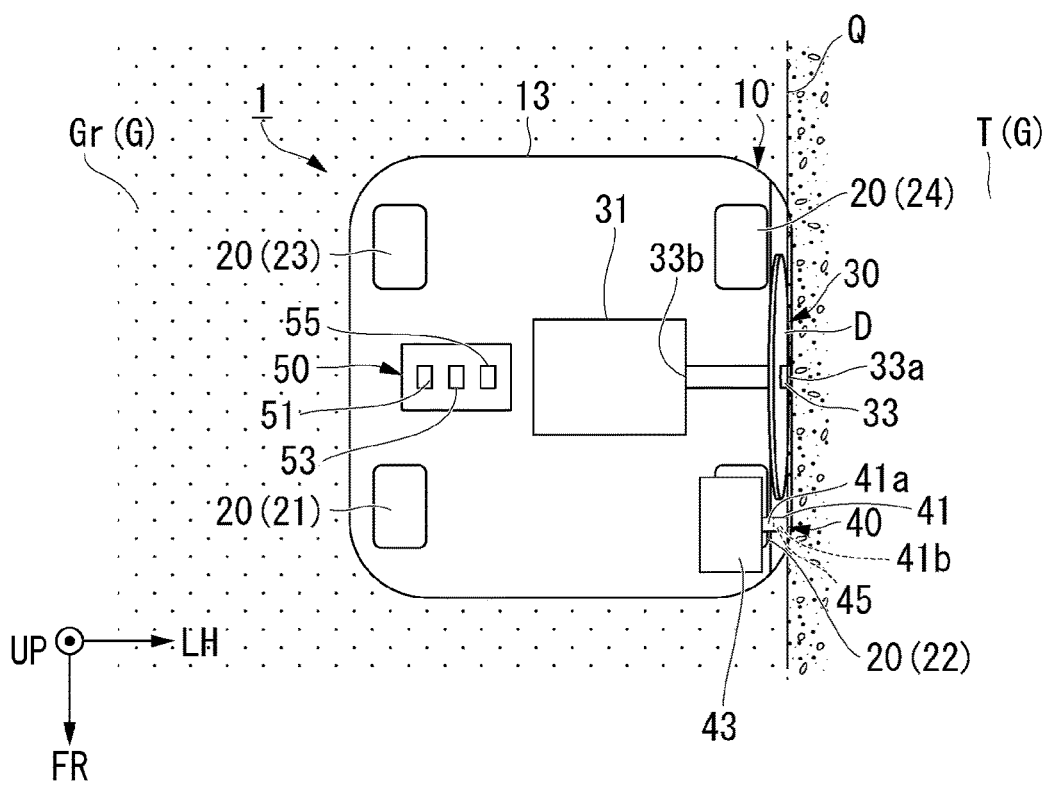
FIG. 2 is a diagram of the autonomous traveling lawn mower of the embodiment as viewed from above.

FIG. 2 is a view of the autonomous traveling lawn mower of the embodiment as viewed from above.

As shown in FIG. 2, the traveling wheels 20 are provided at positions corresponding to the four corners of the frame 11. The traveling wheels 20 include a right front wheel 21 and a left front wheel 22 provided in a front part of the frame 11, and a right rear wheel 23 and a left rear wheel 24 provided in a rear part of the frame 11.

The right rear wheel 23 and the left rear wheel 24 are driven by a traveling motor (not shown) provided for each of them. The autonomous traveling lawn mower 1 moves forward when the left and right traveling motors rotate normally at a constant speed, and moves backward when the left and right traveling motors rotate reversely at a constant speed. The autonomous traveling lawn mower 1 turns when one of the left and right traveling motors rotates.

As shown in FIG. 1, the cutting part 30 is a disk-shaped member having a plurality of blades formed of a metal material on an outer edge. The cutting part 30 is a so-called cutter blade. The cutting part 30 is disposed outward from the left front wheel 22 and the left rear wheel 24, on the left side of the machine body 10. A main surface of the cutting part 30 formed in a disk shape coincides with the cutting surface D. The cutting part 30 is disposed so that the main surface intersects the ground G. As a result, the cutting part 30 has a cutting surface D in a direction intersecting the ground G. The cutting surface D of the cutting part 30 is set to have an angle of, for example, 45° to 90° with respect to the ground G.

The blade of the cutting part 30 is disposed at the boundary Q between the lawn surface Gr and the concrete surface T on the ground G, in the operating state of the autonomous traveling lawn mower 1. As a result, the autonomous traveling lawn mower 1 is able to cut the grass of the edge of the lawn surface Gr, at the boundary Q between the lawn surface Gr and the concrete surface T.

The cutting part 30 is rotationally driven by a cutting part driving motor 31 provided on the frame 11. The cutting part driving motor 31 has an output shaft 33. The output shaft 33 extends from the cutting part driving motor 31 toward the left side of the machine body 10. A front end 33a of the output shaft 33 is connected to the center of the cutting part 30.

That is, the cutting part 30 includes a cutter that is rotatable on a rotating surface along a vertical direction of the machine body 10.

Figure 3:
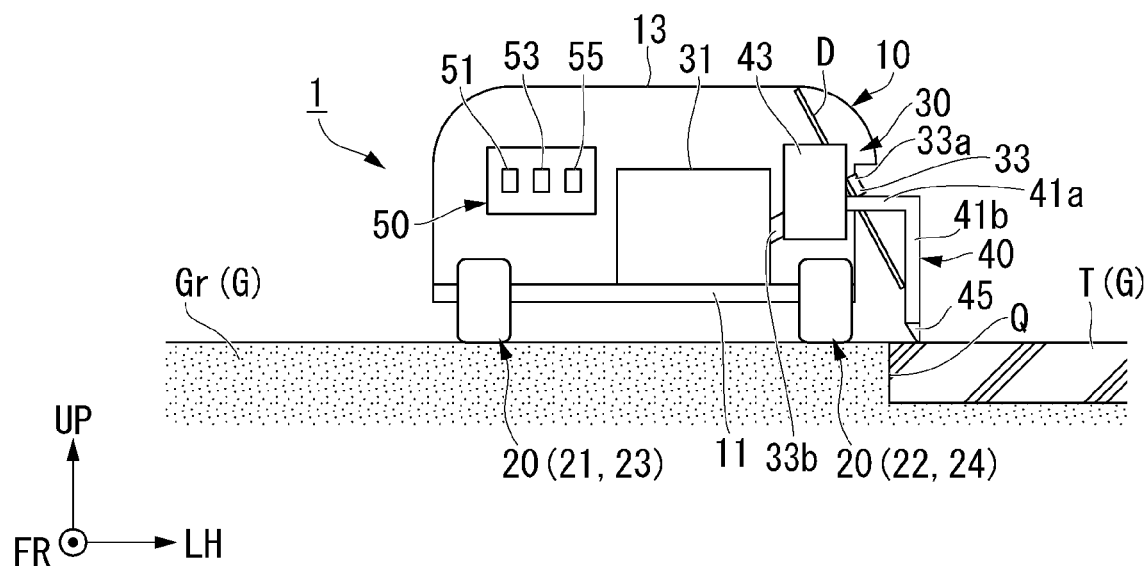
FIG. 3 is a diagram showing a non-operating state of the autonomous traveling lawn mower of the embodiment.

FIG. 3 is a diagram showing a non-operating state of the autonomous traveling lawn mower of the embodiment.

As shown in FIG. 3, a proximal end 33b of the output shaft 33 is rotatable about an axis along the front-rear direction by, for example, an actuator (not shown). The front end 33a and the cutting part 30 of the output shaft 33 are movable in the vertical direction by the rotation of the output shaft 33. As a result, the cutting part 30 of the autonomous traveling lawn mower 1 can be switched between a non-operating state away from the ground G (see FIG. 3) and an operating state being in contact with the ground G (see FIG. 1).

As shown in FIGS. 1 and 2, the detection part 40 detects the boundary Q between the lawn surface Gr and the concrete surface T on the ground G. The detection part 40 includes a main body 41, a movable support part 43, and a contact sensor 45.

The main body 41 is formed in an L shape by a lateral extension 41a extending outward from a left front side surface of the machine body 10, and a downward extension 41b extending downward from the front end of the lateral extension 41a. The main body 41 is disposed in the front part of the machine body 10 from the cutting part 30. The downward extension 41b of the main body 41 is disposed outside the machine body 10 from the cutting part 30. The front end of the downward extension 41b of the main body 41 can come into contact with the ground G. A contact sensor 45 is provided at the front end of the downward extension 41b of the main body 41.

The movable support part 43 is provided on the frame 11. The movable support part 43 is provided with an actuator (not shown) inside. The movable support part 43 supports the proximal end of the lateral extension 41a of the main body 41 to be rotatable about an axis along the front-rear direction and to be movable in the left-right direction by the actuator. As a result, the front end of the downward extension 41b of the detection part 40 moves in the vertical direction and the left-right direction. Therefore, the front end of the downward extension 41b of the detection part 40 can come into contact with the lawn surface Gr and the concrete surface T on the ground G with a predetermined load.

The contact sensor 45 detects a difference between pressure when the lawn surface Gr on the ground G are pressed with a predetermined load and pressure when the concrete surface T on the ground G are pressed with a predetermined load. The contact sensor 45 includes, for example, a piezo element, and detects a difference in pressure by a change in an electrical resistance in response to pressure from the outside.

Here, the detection part 40 is disposed in the front part of the cutting part 30 in the traveling direction of the machine body 10. As a result, after detecting the boundary Q between the lawn surface Gr, which is a working area, and the concrete surface T, which is a non-working area, by the contact sensor 45 of the detection part 40, the autonomous traveling lawn mower 1 can cut the lawn of the edge portion of the lawn surface Gr by the cutting part 30.

The downward extension 41b and the contact sensor 45 of the detection part 40 are disposed outside the machine body 10 from the cutting part 30. As a result, it is possible to cut the lawn of the edge portion of the lawn surface Gr, while preventing the machine body 10 and the cutting part 30 from coming into contact with, for example, a building or the like provided in a non-working area. Further, when moving along the boundary Q between the lawn surface Gr and the concrete surface T, the downward extension 41b and the contact sensor 45 disposed outside the machine body 10 from the cutting part 30 can be made to function as guides.

(Summary of Controller 50)

The summary of the controller 50 will be described. The controller 50 is an example of a control device. The controller 50 is provided on the frame 11. The controller 50 controls the traveling wheels 20, the cutting part 30, the detection part 40, and the like.

The controller 50 switches between a non-operating state (see FIG. 3) in which the cutting part 30 is separated from the ground G and an operating state (see FIG. 1) in which the cutting part 30 is in contact with the ground G. The controller 50 moves the contact sensor 45 by controlling the movable support part 43 of the detection part 40 to detect the boundary Q between the lawn surface Gr, which is a working area, and the concrete surface T, which is a non-working area. The controller 50 drives the cutting part 30 to cut the edge portion of the lawn surface Gr, which is the working area, along the boundary Q based on the information acquired by the detection part 40. The controller 50 drives the traveling wheels 20 to cut the edge portion of the lawn surface Gr, which is the working area, along the boundary Q, and moves the autonomous traveling lawn mower 1, based on the information acquired by the detection part 40.

That is, the traveling wheels 20 move the machine body 10 along the boundary between the working area and the non-working area.

The controller 50 includes a receiver 51 (corresponding to the "position information acquisition part" of the claim), a storage 53, and a transmitter 55. The receiver 51 receives a position signal from the GNSS satellite or information transmitted from an external server 60 (corresponding to the "information processing unit" of the claim). The storage 53 stores the map data. The controller 50 moves the machine body 10 to the boundary Q between the lawn surface Gr and the concrete surface T based on the map data stored in the storage 53, while specifying the position of the machine body 10 of the autonomous traveling lawn mower 1 by the position signal from the GNSS satellite received by the receiver 51. The transmitter 55 transmits the position information of the boundary Q detected by the contact sensor 45 and the detection part 40 to the external server 60.

The server 60 can create map data based on the position information of the boundary Q transmitted from, for example, the transmitter 55, and can transmit the created map data to the receiver 51 of the other autonomous traveling lawn mower 1. As a result, for example, when a plurality of autonomous traveling lawn mowers 1 collaborate, since information on the boundary Q can be transmitted to each other, the plurality of autonomous traveling lawn mowers 1 can share a more accurate position of the boundary Q.

(Edge Mowing Using Autonomous Traveling Lawn Mower)

The above-mentioned autonomous traveling lawn mower 1 performs edge mowing of the lawn at the boundary Q between the lawn surface Gr, which is a working area, and the concrete surface T, which is a non-working area, as follows.

First, the autonomous traveling lawn mower 1 before performing the edge mowing of the lawn is in a non-operating state (see FIG. 3) in which the cutting part 30 is separated from the ground G.

Figure 4:
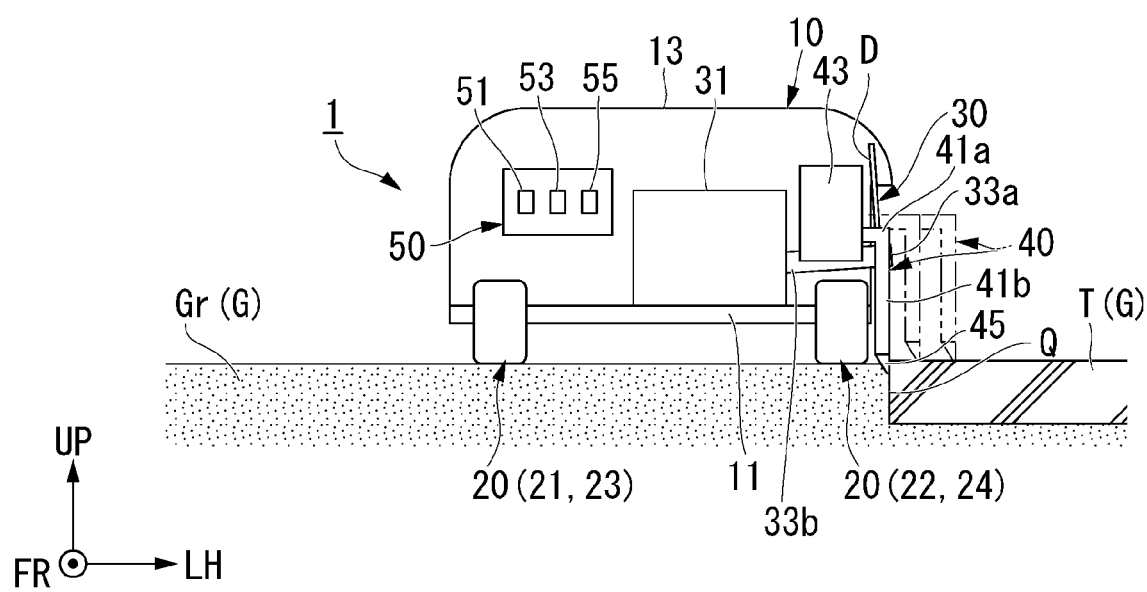
FIG. 4 is an explanatory view when a detection part detects a boundary between a lawn surface and a concrete surface.

Next, the autonomous traveling lawn mower 1 specifies the position of its own body 10 by the position signal from the GNSS satellite received by the receiver 51 of the controller 50. The autonomous traveling lawn mower 1 moves to the vicinity of the boundary Q between the lawn surface Gr and the concrete surface T, based on the position signal from the GNSS satellite and the map data stored in the storage 53. For example, as shown in FIG. 4, the autonomous traveling lawn mower 1 moves to a position on the lawn surface Gr at which the concrete surface T is on the left side of the machine body 10.

In the following description, the information indicating the position of the machine body 10 of the own machine specified by the position signal from the GNSS satellite is also referred to as own machine position information. The receiver 51 also functions as a position information acquisition part that acquires position information (that is, own machine position information) indicating the position of the machine body 10.

Next, the autonomous traveling lawn mower 1 detects the boundary Q between the lawn surface Gr and the concrete surface T by the detection part 40.

The autonomous traveling lawn mower 1 is made to come into contact with the ground G with a predetermined load by moving the detection part 40, discriminates the lawn surface Gr and the concrete surface T by detecting a difference in pressure, and determines the boundary Q between the lawn surface Gr and the concrete surface T.

FIG. 4 is an explanatory diagram when the detection part detects the boundary between the lawn surface and the concrete surface. Specifically, as shown in FIG. 4, on the left outer side of the machine body 10, the contact sensor 45 of the detection part 40 is pressed against the concrete surface T which is the ground G with a predetermined load to measure the contact pressure. Next, the contact sensor 45 of the detection part 40 is moved to the machine body 10 side (right side), and similarly, the contact sensor 45 is pressed against the ground G with a predetermined load to measure the contact pressure. When the aforementioned operation is repeated a plurality of times and the contact sensor 45 reaches the boundary Q between the lawn surface Gr and the concrete surface T, the contact pressure in the lawn surface Gr is lower than the contact pressure in the concrete surface T. As a result, the autonomous traveling lawn mower 1 can detect the boundary Q between the lawn surface Gr and the concrete surface T.

Next, the autonomous traveling lawn mower 1 moves along the boundary Q between the lawn surface Gr and the concrete surface T detected by the detection part 40, and cuts the lawn of the edge portion of the lawn surface Gr. In this way, the autonomous traveling lawn mower 1 can perform the edge mowing.

(Details of Controller 50)

As described above, the own machine position information acquired by the receiver 51 is stored in the storage 53. If the autonomous traveling lawn mower 1 stores the own machine position information in the storage 53, while moving along the boundary Q between the working area and the non-working area, the storage 53 stores map data indicating the position of the boundary Q.

However, the autonomous traveling lawn mower 1 does not always move along the boundary Q. Therefore, in general, the own machine position information stored in the storage 53 may include a mixture of information indicating the position of the boundary Q and information not indicating the position of the boundary Q.

Therefore, the controller 50 determines whether to move along the boundary Q by various methods. When the controller 50 determines to move along the boundary Q, the controller 50 stores the own machine position information in the storage 53. According to the autonomous traveling lawn mower 1 configured in this way, it is possible to generate map data that accurately indicates the position of the boundary Q.

The transmitter 55 is able to transmit the position information stored in the storage 53 to the outside as map data that accurately indicates the position of the boundary Q.

Hereinafter, the details of the controller 50 will be described with reference to FIG. 5.

Figure 5:
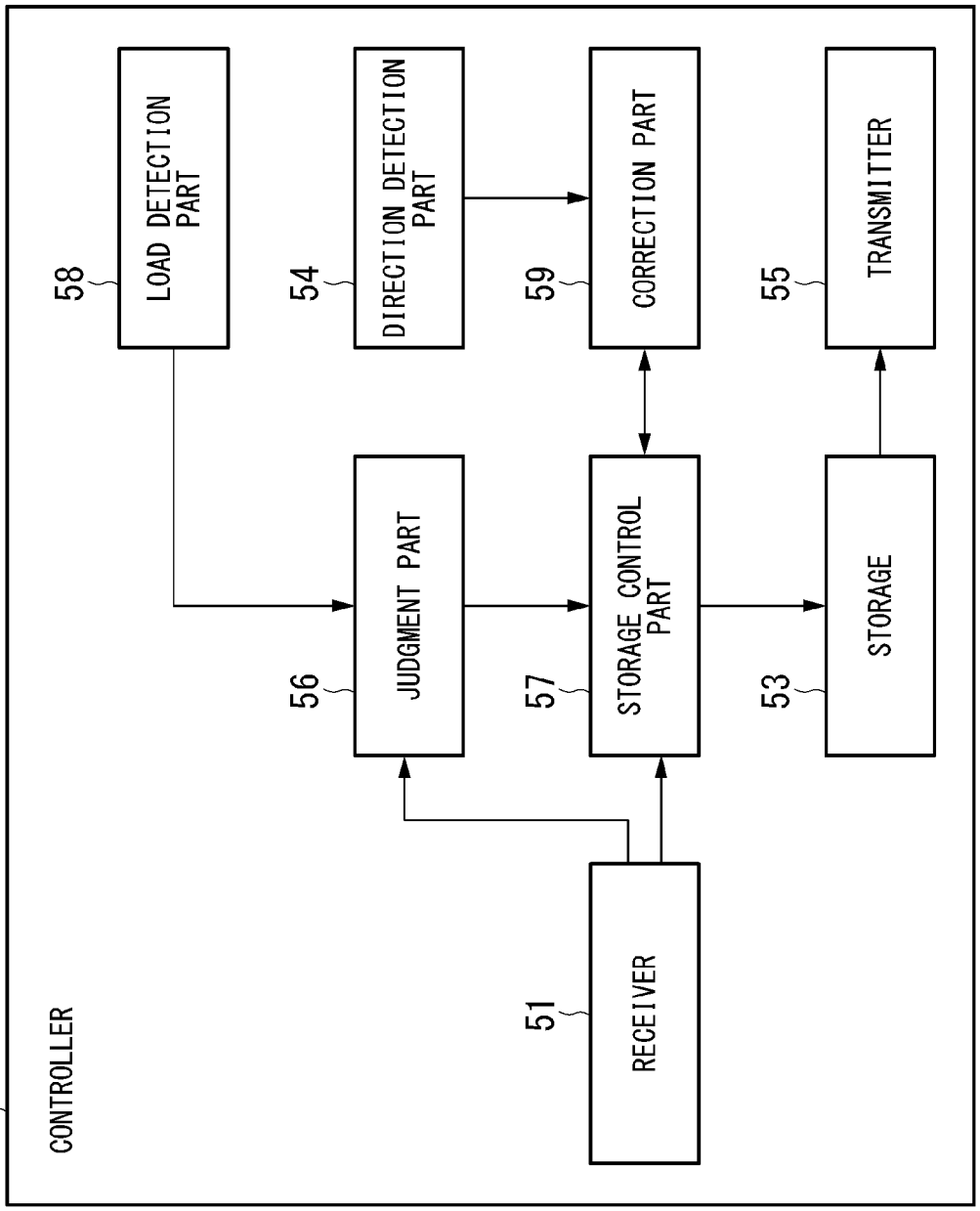
FIG. 5 is a diagram showing an example of a functional configuration of a control part of the embodiment.

FIG. 5 is a diagram showing an example of the functional configuration of the controller 50 of the embodiment.

The controller 50 is equipped with a direction detection part 54, a judgment part 56, a storage control part 57, a load detection part 58, and a correction part 59, in addition to the receiver 51, the storage 53, and the transmitter 55 described above. First, the judgment part 56 and the storage control part 57 will be described.

In this example, although the controller 50 will be described as a computer device mounted on the autonomous traveling lawn mower 1, the present invention is not limited thereto. The controller 50 may be configured as an external computer device (for example, a server) of the autonomous traveling lawn mower 1.

When the controller 50 is configured as an external computer device of the autonomous traveling lawn mower 1, the controller 50 acquires the information, which is output from the autonomous traveling lawn mower 1, via a wired communication, a wireless communication or a storage medium, and operates based on the acquired information. In this case, the controller 50 includes an operating state acquisition part (not shown) that acquires information indicating the operating state of the autonomous traveling lawn mower 1. The operating state acquisition part (not shown) may be configured as, for example, a communication part that communicates with the autonomous traveling lawn mower 1, or a reading part which reads information indicating the operating state from the storage medium in which information indicating the operating state of the autonomous traveling lawn mower 1 is stored.

The judgment part 56 determines the operating state of the machine body 10. The operating state of the machine body 10 includes an operating state of the traveling wheels 20 and an operating state of the cutting part 30.

The storage control part 57 stores the position information acquired by the receiver 51 (that is, the own machine position information) in the storage 53, based on the determination result of the judgment part 56.

(Generation of Map Data: Part 1)

As an example, the autonomous traveling lawn mower 1 stores the own machine position information in the storage 53 when the cutting part 30 performs a cutting operation.

Specifically, the judgment part 56 detects the operating state of the cutting part 30. When the judgment part 56 detects that the cutting part 30 performs the cutting operation, it determines that the own machine position information is stored.

When the judgment part 56 determines that the own machine position information is stored, the storage control part 57 stores the own machine position information acquired by the receiver 51 in the storage 53.

Figure 6:
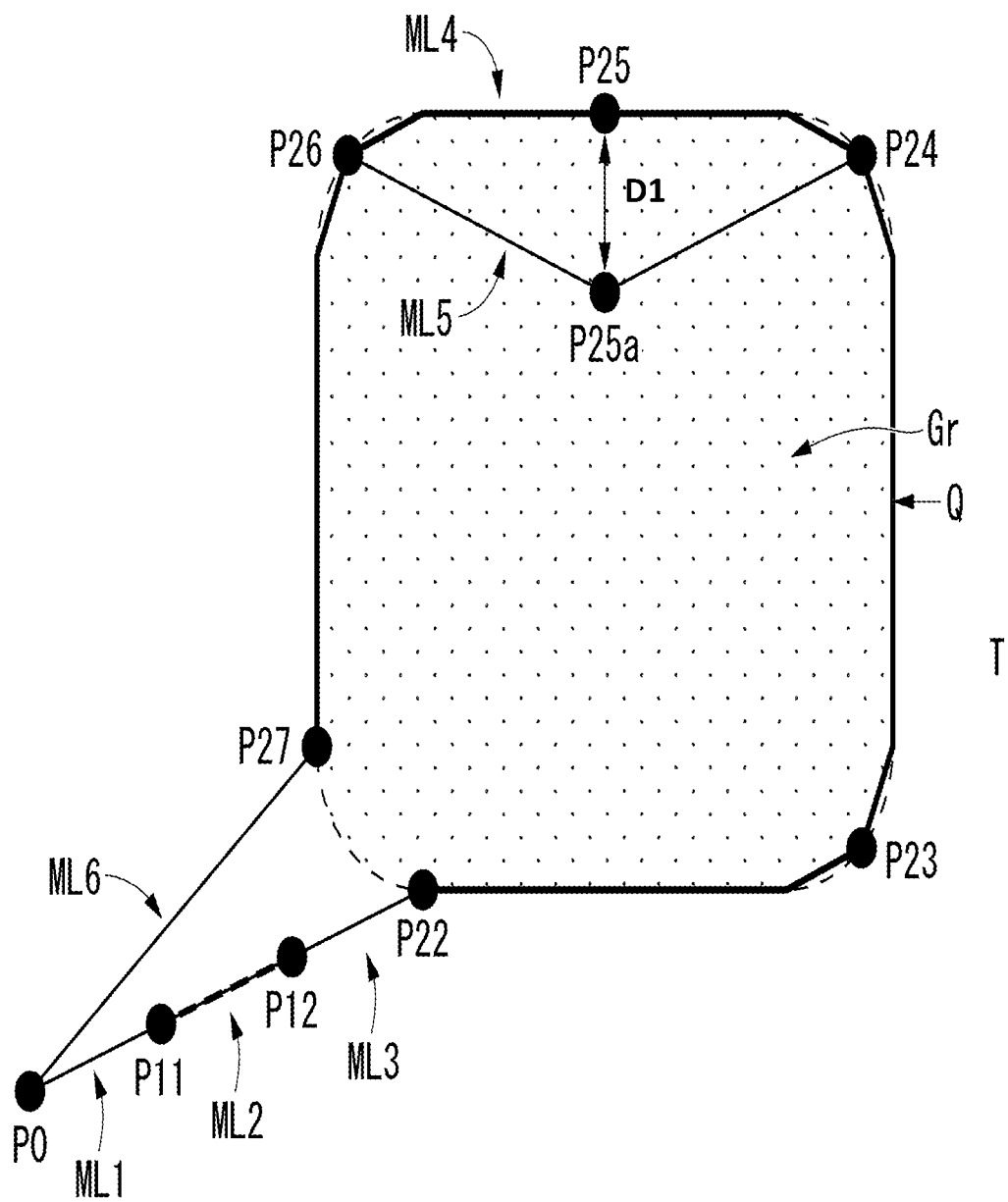
FIG. 6 is a diagram showing an example of a movement locus of the autonomous traveling lawn mower of the embodiment.

FIG. 6 is a diagram showing an example of the movement locus of the autonomous traveling lawn mower 1 of the embodiment. The autonomous traveling lawn mower 1 starts from a position P0 and returns to the position P0 via positions P11 to P27. Here, an inner side of an area surrounded by the positions P22 to P27 is the lawn surface Gr (that is, the working area). An outer side of the area surrounded by the positions P22 to P27 is the concrete surface T (that is, the non-working area). The autonomous traveling lawn mower 1 cuts the lawn of the edge portion of the lawn surface Gr, at the boundary Q between the lawn surface Gr and the concrete surface T. The autonomous traveling lawn mower 1 performs a cutting operation by the cutting part 30, while moving from the position P22 to the position P27. That is, the cutting operation using the cutting part 30 is performed in the movement locus ML4 between the position P22 and the position P27, among the movement locus ML1 to the movement locus ML6 from the position P0 to the return to the position P0 via the position P22 to the position P27.

In this example, the judgment part 56 determines that the own machine position information between the position P22 and the position P27 is stored. As a result, the movement locus ML4 between the position P22 and the position P27 is stored in the storage 53 as mapping data indicating the boundary Q.

As described above, the cutting part 30 performs edge mowing (that is, cutting operation) of the lawn at the boundary Q. In this case, the fact that the cutting part 30 performs the cutting operation indicates that the autonomous traveling lawn mower 1 is located at the boundary Q. According to the autonomous traveling lawn mower 1 configured in this way, it is possible to generate map data that accurately indicates the position of the boundary Q.

(Generation of Map Data: Part 2)

As shown in FIG. 5, as another example, when the cutting part 30 performs a cutting operation, if the load generated on the cutting part 30 is relatively large, the autonomous traveling lawn mower 1 stores the own machine position information in the storage 53.

Specifically, the load detection part 58 detects the load generated in the cutting part 30. Here, the load generated on the cutting part 30 changes depending on the operating state of the cutting part 30, such as a state in which the cutting part 30 cuts the lawn or a state in which the cutting part 30 is idling in the non-operating state away from the ground G. The load detection part 58 includes a torque sensor, a rotation speed sensor, a current sensor, and the like, and detects the degree of load generated on the cutting part 30. In this example, the degree of load in the state in which the cutting part 30 cuts the lawn is greater than the degree of load in the state in which the cutting part 30 idles.

The judgment part 56 determines the operating state based on the load of the cutting part 30 detected by the load detection part 58. When the degree of load of the cutting part 30 detected by the load detection part 58 is greater than a predetermined threshold value, the judgment part 56 determines that there is a state of cutting the lawn. In this case, the judgment part 56 determines that the own machine position information is stored.

When the judgment part 56 determines that the own machine position information is stored, the storage control part 57 stores the own machine position information acquired by the receiver 51 in the storage 53.

In the example shown in FIG. 6, in the autonomous traveling lawn mower 1, the cutting part 30 is idling between the position P11 and the position P12 (movement locus ML2). That is, in this example, although the cutting part 30 is operating between the position P11 and the position P12 (movement locus ML2), the load of the cutting part 30 is lower than the predetermined threshold value.

In this example, the judgment part 56 determines that the own machine position information is not stored between the position P11 and the position P12 (movement locus ML2). As a result, the movement locus ML2 is not included in the map data of the storage 53.

There is a case where the autonomous traveling lawn mower 1 may idle the cutting part 30 in a non-operating state in which the cutting part 30 is separated from the ground G at a place other than the boundary Q. As described above, the storage control part 57 does not store the own machine position information in the storage 53, when the cutting part 30 is idling. According to the autonomous traveling lawn mower 1 configured in this way, it is possible to generate map data that accurately indicates the position of the boundary Q.

(Generation of Map Data: Part 3)

As shown in FIG. 5, as another example, the autonomous traveling lawn mower 1 stores the own machine position information in the storage 53, based on the movement direction of the machine body 10.

Specifically, the judgment part 56 is able to detect the operation (for example, a rotation speed or a steering angle)

of the traveling wheels 20. The judgment part 56 determines the movement direction of the machine body 10, based on the operation of the traveling wheels 20. The judgment part 56 is able to calculate the movement locus of the machine body 10 indicated by the own machine position information, by calculating a time-series change of the own machine position information acquired by the receiver 51. The judgment part 56 determines the movement direction of the machine body 10 based on the produced movement locus.

The judgment part 56 determines the operating state, based on the movement direction of the machine body 10 based on the operation of the traveling wheels 20, and the movement direction of the machine body 10 indicated by the position information acquired by the receiver 51.

When the movement direction of the machine body 10 based on the operation of the traveling wheels 20 substantially matches the movement direction of the machine body 10 indicated by the position information acquired by the receiver 51, the judgment part 56 determines that the own machine position information is stored.

When the judgment part 56 determines that the own machine position information is stored, the storage control part 57 stores the own machine position information acquired by the receiver 51 in the storage 53.

Here, when the movement direction of the machine body 10 based on the operation of the traveling wheels 20 substantially matches the movement direction of the machine body 10 indicated by the position information acquired by the receiver 51, the own machine position information with high reliability can be acquired. According to the autonomous traveling lawn mower 1 configured in this way, it is possible to generate map data that accurately indicates the position of the boundary Q.

(Correction of Own Machine Position Information)

Next, the correction of the own machine position information using the correction part 59 will be described. A position accuracy of the own machine position information acquired by the receiver 51 may decrease depending on the situation. The correction part 59 corrects the position information (that is, the own machine position information) acquired by the receiver 51. As a result, the correction part 59 suppresses an accuracy degradation of the map data due to a degradation of the position accuracy of the own machine position information. Hereinafter, a specific example of a correction of the own machine position information using the correction part 59 will be described.

(Correction of Own Machine Position Information: Part 1)

As described above, the cutting part 30 is a so-called cutter blade, and operates in a predetermined direction. The operating directions of the cutter blades differ from each other depending on the non-operating state away from the ground G and the operating state being in contact with the ground G. The operating direction of the cutting part 30 in this case is a direction of the rotary shaft of the cutter blade.

Even though the cutting part 30 is operating in the operating state being in contact with the ground G, when the own machine position information indicates a position far away from the boundary Q, the position accuracy of the own machine position information may decrease. When the cutting part 30 is operating in the operating state being in contact with the ground G, if the own machine position information indicates a position far away from the boundary Q, the correction part 59 corrects the own machine position information. That is, the correction part 59 corrects the own machine position information based on the operation direction of the cutting part 30.

For example, as shown in FIG. 6, when the position accuracy of the own machine position information is degraded at the position P25, even if the autonomous traveling lawn mower 1 passes the position P25 along the movement locus ML4, in some cases, the passing position indicated by the own machine position information may be the position P25*a*. In this case, at the position P25, the position P25, which is the actual passing position of the autonomous traveling lawn mower 1 is separated by a distance D1 from a position P25*a*, which is a passing position indicated by the own machine position information whose position accuracy is degraded. When the distance D1 is greater than a predetermined threshold value, the correction part 59 corrects the own machine position information from the position P25*a* to the position P25.

(Correction of Own Machine Position Information: Part 2)

As shown in FIG. 5, the cutting part 30 is a so-called cutter blade, and is rotationally driven by a cutting part driving motor 31 provided on the frame 11. The autonomous traveling lawn mower 1 moves in the rotation direction of the cutter blade, while rotating the cutter blade along the boundary Q. The operating direction of the cutting part 30 in this case is the rotation direction of the cutter blade and the movement direction of the autonomous traveling lawn mower 1. In this case, the operating direction of the cutting part 30 substantially matches the direction along the boundary Q. That is, the cutting part 30 operates in a direction corresponding to the movement direction of the machine body 10. Here, when the position accuracy of the own machine position information acquired by the receiver 51 is degraded, there may be a deviation between the movement direction of the autonomous traveling lawn mower 1 indicated by the operating direction of the cutting part 30, and the movement direction of the autonomous traveling lawn mower 1 indicated by the own machine position information acquired by the receiver 51. In this case, the correction part 59 corrects the own machine position information, based on the movement direction of the machine body 10 indicated by the own machine position information and the operating direction of the cutting part 30.

(Correction of Own Machine Position Information: Part 3)

When the correction part 59 corrects the own machine position information, the autonomous traveling lawn mower 1 may store the correction position in the storage 53, as a place where the position accuracy of the own machine position information is degraded. That is, the storage control part 57 stores the correction position information indicating the position at which the correction part 59 corrects the position information, in the storage 53.

As described above, at the position P25 shown in FIG. 6, the position P25 which is the actual passing position of the autonomous traveling lawn mower 1 is separated by a distance D1 from the position P25*a* which is the passing position indicated by the own machine position information whose position accuracy is degraded. When the distance D1 is greater than a predetermined threshold value, the correction part 59 corrects the own machine position information from the position P25*a* to the position P25.

In this case, the storage control part 57 stores the position P25 (or the position P25*a*) in the storage 53 as correction position information. That is, the correction position information indicates that the position P25 is a place where the position accuracy of the own machine position information is degraded.

According to the autonomous traveling lawn mower 1 configured in this way, the correction position information can be used as information indicating a place where the position accuracy of the own machine position information is degraded.

(Correction of Own Machine Position Information: Part 4)

As shown in FIG. 5, the autonomous traveling lawn mower 1 may correct the own machine position information by detecting the direction of the machine body 10 of the own machine. In this example, the direction detection part 54 includes, for example, a geomagnetic detection device such as a compass, or an inertial navigation device such as a gyro sensor, and is able to detect the direction of the machine body 10.

In this case, when the direction of the machine body 10 detected by the direction detection part 54 does not match the direction of the machine body 10 indicated by the own machine position information body, the correction part 59 corrects the own machine position information, based on the direction of the machine body 10 detected by the direction detection part 54.

According to the autonomous traveling lawn mower 1 configured in this way, it is possible to suppress an accuracy degradation of the map data due to a degradation of the position accuracy of the own machine position information.

In addition, the storage control part 57 may store various types of information, such as a time when the own machine position information is acquired, an operating state of the machine body 10 when the own machine position information is acquired (for example, an operating state of the traveling wheels 20, an operating state of the cutting part 30, the direction of the machine body 10, and the like), and the own machine position information before being corrected by the correction part 59, in the storage 53 in association with the own machine position information.

According to the autonomous traveling lawn mower 1 configured in this way, the range of utilization of map data can be expanded by combining various types of information stored in the storage 53.

For example, the movement locus and the load information of each point may be transmitted to the server, and the time (or area) when the load is high and the position of the working machine at that time may be superimposed to create the boundary map.

The technical scope of the present invention is not limited to the above-described embodiment, and various modifications can be made without departing from the spirit of the present invention.

In the above-described embodiment, as an example of the working machine, the autonomous traveling lawn mower 1 that moves along the boundary Q between the lawn surface Gr and the concrete surface T and cuts the lawn of the edge portion of the lawn surface Gr has been described. In contrast, the working machine is not limited to the above-mentioned autonomous traveling lawn mower 1, and may be, for example, a working machine that works around or along the boundary between the working area and the non-working area, such as a snowplow, a cultivator, a vacuum cleaner, and a transporter.

The working machine does not necessarily need to be an autonomous mobile device. The working machine may be, for example, a handheld type device carried by the worker, a walking type device in which the worker pushes or pulls while walking, or a riding type device in which the worker drives.

In the above-described embodiment, the cutting part 30 including the cutter blade has been described as an example of the working part of the autonomous traveling lawn mower 1. In contrast, the working part is not limited to the cutting part 30, and may be, for example, a snow removing part as a working part of a snowplow, a rotor as a working part of a cultivator, a suction part or a brush as a working part of a vacuum cleaner, a loading platform as a working part of a transporter, or the like.

In the above-described embodiment, the cutting part 30 was a cutter blade having a plurality of blades formed of a metal material on the outer edge, but is not limited to this embodiment. The cutting part 30 may be a nylon cord cutter in which a plurality of string-shaped nylon cords are attached to the outer edge of the disk-shaped member.

According to this configuration, even when the cutting part 30 comes into contact with a structure, concrete, tile, fence, or the like, which is a non-working area, damage to the cutting part 30 can be suppressed.

In the above-described embodiment, in the cutting part 30, the proximal end 33b of the output shaft 33 is rotatable, and a non-operating state away from the ground G and an operating state being in contact with the ground G can be switched by the rotation of the output shaft 33. In contrast, for example, the cutting part driving motor 31 may be moveable up and down with respect to the frame 11, and the cutting part 30 may be switchable between the non-operating state away from the ground G and the operating state being in contact with the ground G by the vertical movement of the cutting part driving motor 31.

In the above-described embodiment, the detection part 40 includes the contact sensor 45 that detects a difference in pressure when the lawn surface Gr and the concrete surface T on the ground G are pressed with a predetermined load. However, the embodiment is not limited to this aspect.

The detection part 40 may include an image sensor capable of recognizing the lawn surface Gr, which is the working area, and the concrete surface T, which is the non-working area, by an image. According to this configuration, when the non-working area is concrete, tile, or the like, it is suitable for detecting the lawn which is the working area and the non-working area.

The detection part 40 may include a sound sensor capable of discriminating between the lawn surface Gr, which is the working area, and the concrete surface T, which is the non-working area, by the sound generated when the cutting part 30 comes into contact with the ground. According to this configuration, since the sound sensor is provided, it is possible to distinguish between the sound of the cutting part 30 coming into contact with the working area and the sound of the cutting part 30 coming into contact with the non-working area. Therefore, the boundary Q between the working area and the non-working area can be detected. It is particularly suitable when the cutting part 30 is a nylon cord cutter.

In the above-described embodiment, the transmitter 55 transmits the position information or the like of the boundary Q detected by the contact sensor 45 and the detection part 40 to the external server 60, but the embodiment is not limited to this aspect. For example, the transmitter 55 may transmit boundary information to a working machine such as a drone that acquires map data from the air. As a result, since the map data acquired by a working machine such as a drone can be complemented, more accurate map data can be created.

When a plurality of autonomous traveling lawn mowers 1 collaborate, communication of information on the boundary Q or the position information of the own machine may be performed by the receiver 51 and the transmitter 55 of the plurality of autonomous traveling lawn mowers 1. As a result, a plurality of autonomous traveling lawn mowers 1 can share a more accurate position of the boundary Q. Therefore, the work can be performed accurately around the boundary Q as compared with the related art.

In the above-described embodiment, the server 60 creates map data based on the position information of the boundary Q transmitted from the transmitter 55, and transmits the created map data to the receiver 51 of the other autonomous traveling lawn mower 1. However, the embodiment is not limited to this aspect. For example, the server 60 may create control signals for the cutting part 30 and the traveling wheels 20 based on the information acquired by the contact sensor 45 and the information detected by the detection part 40. As a result, map data can be created and the autonomous traveling lawn mower 1 can be controlled, based on the excellent processing capacity of the external server.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Autonomous traveling lawn mower (autonomous traveling working machine)
20 Traveling wheels (traveling part)
21 Right front wheel
22 Left front wheel
23 Right rear wheel
24 Left rear wheel
30 Cutting part (working part)
40 Detection part
45 Contact sensor
50 Control part
51 Receiver
53 Storage
54 Direction detection part
55 Transmitter
56 Judgment part
57 Storage control part
58 Load detection part
59 Correction part
60 Server (Information processing part)
Gr Lawn surface (working area)
T Concrete surface (non-working area)
Q Boundary
P Position
ML Movement locus

What is claimed is:

1. A control device which is configured to acquire information which is output from a working machine which includes a working part placed with a main surface intersecting a ground and works along a boundary between a working area and a non-working area, the control device comprising:
a processor configured to:
acquire information indicating an operating state of a machine body of the working machine, wherein the machine body comprises a piezoelectric sensor that detects the boundary between the working area and the non-working area, wherein the piezoelectric sensor is situated on a downward extension of a laterally extendable L shaped prong comprising a lateral extension and the downward extension, and wherein the working part is operational in response to determining that the piezoelectric sensor is in contact with an intersection representative of the boundary between the working area and the non-working area;
determine the operating state of the machine body, based on the information representing the operating state;
acquire position information indicating a position of the machine body; and
store the position information to a storage device, based on the operating state of the machine body.

2. The control device according to claim 1, wherein the processor is further configured to:
detect a load generated in the working part, and
determine the operating state, based on the load of the working part.

3. The control device according to claim 1,
wherein the processor is configured to determine the operating state, based on a movement direction of the machine body based on movement of the machine body, and a movement direction of the machine body indicated by the position information.

4. The control device according to claim 1, wherein the processor is configured to:
correct the position information.

5. The control device according to claim 4,
wherein the working part is configured to operate in a predetermined direction, and
wherein the processor is configured to correct the position information based on an operation direction of the working part.

6. The control device according to claim 4,
wherein the working part is configured to operate in a direction corresponding to the movement direction of the machine body, and
wherein the processor is configured to correct the position information based on the movement direction of the machine body indicated by the position information and an operation direction of the working part.

7. The control device according to claim 4,
wherein the storage device stores correction position information indicating a position at which a position correction was made.

8. The control device according to claim 4, wherein the processor is configured to:
detect the direction of the machine body, and
correct the position information based on the direction of the machine body.

9. A working machine which works along a boundary between a working area and a non-working area, the working machine comprising:
the control device according to claim 1; and
the working part.

10. The working machine according to claim 9, wherein the working part includes a cutter which is rotatable on a rotating surface along a vertical direction of the machine body.

11. The working machine according to claim 9, wherein the processor is configured to:
transmit the position information stored in the storage device outside.

12. The working machine according to claim 9, wherein the processor is configured to:
move the machine body along the boundary between the working area and the non-working area.

* * * * *